(12) United States Patent
Stevens (10) Patent No.: US 7,601,650 B2
(45) Date of Patent: Oct. 13, 2009

(54) CARBON NANOTUBE DEVICE AND PROCESS FOR MANUFACTURING SAME

(75) Inventor: Ramsey M. Stevens, Danville, CA (US)

(73) Assignee: Carbon Design Innovations, Inc., Burlingame, CA (US)

(*) Notice: Subject to any disclaimer, the term of this patent is extended or adjusted under 35 U.S.C. 154(b) by 259 days.

(21) Appl. No.: 11/669,037

(22) Filed: Jan. 30, 2007

(65) Prior Publication Data

US 2008/0182089 A1 Jul. 31, 2008

(51) Int. Cl.
*H01L 21/31* (2006.01)
(52) U.S. Cl. .......... 438/787; 977/743
(58) Field of Classification Search ............ 977/743; 438/787

See application file for complete search history.

(56) References Cited

U.S. PATENT DOCUMENTS

| | | | |
|---|---|---|---|
| 6,589,835 B2 | 7/2003 | Chang et al. | |
| 6,759,653 B2 | 7/2004 | Nakayama et al. | |
| 6,827,979 B2 | 12/2004 | Mirkin et al. | |
| 7,033,647 B2 | 4/2006 | Tang et al. | |
| 7,144,287 B2 * | 12/2006 | Guillorn et al. | 445/24 |
| 2002/0001970 A1 * | 1/2002 | Becker | 438/761 |
| 2005/0191427 A1 | 9/2005 | Wade et al. | |
| 2005/0208304 A1 * | 9/2005 | Collier et al. | 428/403 |
| 2005/0260355 A1 | 11/2005 | Weber et al. | |
| 2006/0233694 A1 | 10/2006 | Sandhu et al. | |
| 2008/0272299 A1 * | 11/2008 | Jin et al. | 250/310 |

OTHER PUBLICATIONS

Stevens et al., "Carbon Nanotubes As Probes For Atomic Force Microscopy," Nanotechnlogy 2000, 11: 1-5.
Stevens et al., "Improved Fabrication Approach For Carbon Nanotube Probe Devices," Appl. Phys. Lett. Nov. 2000, 77(21):3453-3455.
Delzeit et al., "Growth of Carbon Nanotubes by Thermal and Plasma Chemical Vapor Deposition Processes and Applications in Microscopy," Nanotechnology 2002, 13:280-284.
Onaran et al., "A New Atomic Force Microscope Probe With Force Sensing Integrated Readout and Active Tip," Review of Scientific Instruments 2006, 77:023501-1-023501-7.
PCT Search Report dated May 22, 2008.

* cited by examiner

*Primary Examiner*—Trung Dang
(74) *Attorney, Agent, or Firm*—Perkins Coie LLP (57) ABSTRACT

The present invention contemplates a variety of methods and techniques for fabricating an improved carbon nanotube (CNT) device such as an AFM probe. A CNT is first formed on a desired location such as a substrate. The CNT and substrate are then covered with a protective layer through a CVD or other suitable process. Then a length of the CNT is exposed through etching or other suitable process, the exposed length being formed to a length suitable for a desired application for the CNT device.

21 Claims, 7 Drawing Sheets

CARBON NANOTUBE DEVICE AND PROCESS FOR MANUFACTURING SAME

BACKGROUND OF THE INVENTION

1. Field of the Invention

The present invention relates to scanning probe microscopy, and more specifically, the present invention teaches a variety of carbon nanotube (CNT) devices and processes for fabricating CNT devices.

2. Description of Related Art

One prior art method for fabricating conventional scanning probe microscope (SPM) probes uses standard lithographic techniques and materials. The probes made by this method typically have a pyramidal tip shape and are fabricated from silicon. Some more specialized SPM probes include the etch sharpened conventional silicon probe, the adhesive or electrically fused attached carbon nanotube probes, directly grown nanotube probes and amorphous carbon spike probes.

The techniques and materials as defined by standard lithographic processes limit conventional probes. The materials typically used are silicon or silicon nitride. These materials are hard but brittle and can chip and wear relatively easily. The lithographic techniques as well as the materials limit the aspect ratio of these conventional probes. Lithographic techniques have a lower limit on feature size making high aspect ratio probes difficult to manufacture. More importantly, the brittle material found in etch sharpened conventional probes or focused ion beam milled conventional probes will break easily if the aspect ratio is too high.

The more specialized carbon nanotube (CNT) tips take advantage of some of the useful properties of the CNT, but prior art CNT attachment and/or growth techniques have little control over CNT length of CNT and optimizing imaging configuration. Amorphous carbon spike probes do not have the robust nature of and can break more easily then CNT tip probes.

SUMMARY OF THE INVENTION

The present invention contemplates a variety of methods and techniques for fabricating an improved carbon nanotube (CNT) device such as an AFM probe.

The effective length of the CNT in a CNT AFM scanning probe, and the amount of exposed CNT electrode in a CNT based electrochemical probe can be important aspects affecting the performance of such devices. An embodiment of this invention utilizes material deposition and etching processes on an existing CNT probe or device to control the stability and exposed length of the CNT.

According to one embodiment, a CNT AFM probe is fabricated through existing techniques such as the following documents which are incorporated herein by reference: (1) "Carbon nanotubes as probes for atomic force microscopy", Nanotechnology 11(2000) 1-5; (2) "Improved Fabrication approach for carbon nanotube probe devices", Appl. Phys. Lett., vol. 77, number 21, November 2000; and (3) "Growth of carbon nanotubes by thermal and plasma chemical vapor deposition processes and applications in microscopy", Nanotechnology 13 (2002) 280-284, the con.

In an exemplary embodiment, the CNT AFM probe may be coated with a thermal CVD deposition Si02 using a Tetraethyl Orthosilicate precursor at 500 mtorr and 725 C. Deposition thickness depends on factors such as temperature, pressure, and run time.

The Si02 layer formed on the CNT AFM probe is then etched using various techniques to render a controlled length of exposed CNT. For example, an ion beam etch may be used for etching the end of the coated nanotube preferentially, and reactive ion etching and wet etching using HF are used to further expose the CNT and or to clean Si02 remnant or residue from the CNT. Various lengths of exposed CNT define their utility as AFM probes. A CNT with longer exposed length is used for high aspect ratio imaging and a CNT with a shorter exposed length is best used for high resolution imaging. Short lengths of exposed CNT or even recessed but still exposed CNT probes can be used for electrochemical purposes. The SiO2 coating also serves to reinforce and stabilize the CNT. As will be appreciated, other material deposition techniques and other coating materials are possible.

Carbon nanotubes are also used as field emitters, sensors, logic devices, electrical contacts or interconnects. The present invention contemplates exposing materials other than carbon, e.g., metals, metal alloys, crystals and ceramics.

In one aspect, the present technique of controlled CNT exposure is applied to a nanotube that has been placed or grown in a desired location.

Figure 1:
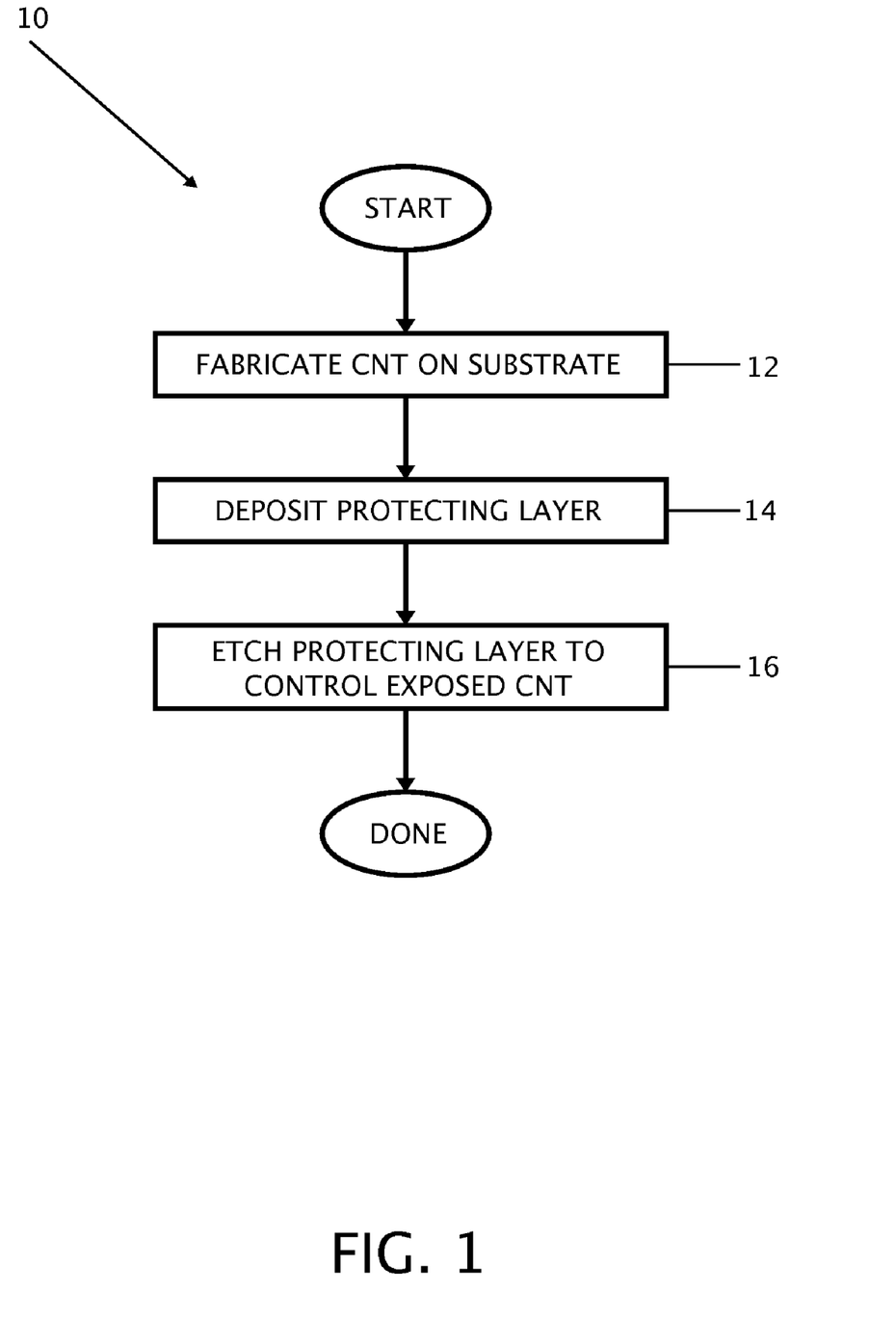
FIG. 1 is a flow chart of a process for fabricating a carbon nanotube (CNT) device according to an embodiment of the present invention.
Figure 2:
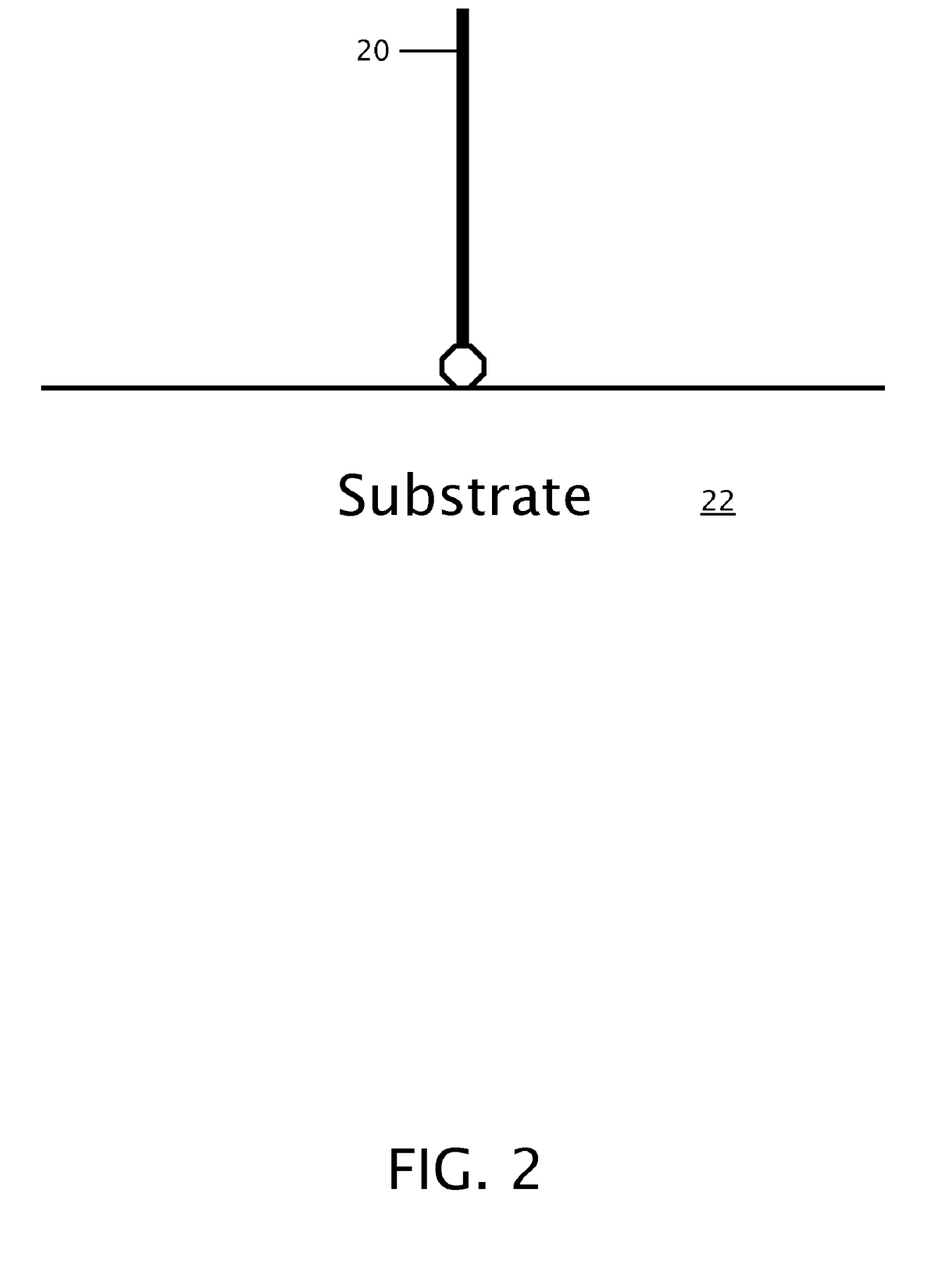
FIG. 2 illustrates a carbon nanotube grown or placed in a desired location.

FIG. 1 is a flow chart showing a process 10 for fabricating a carbon nanotube (CNT) device according to one aspect of the present invention. The process 10 begins at a CNT formation step 12 by forming a CNT 20 at a desired location. As shown in the embodiment of FIG. 2, the CNT 20 is formed on a substrate 22. The CNT formation step 12 may be accomplished by any suitable method such as through an attachment method or by direct growth from the substrate 22.

Figure 3:
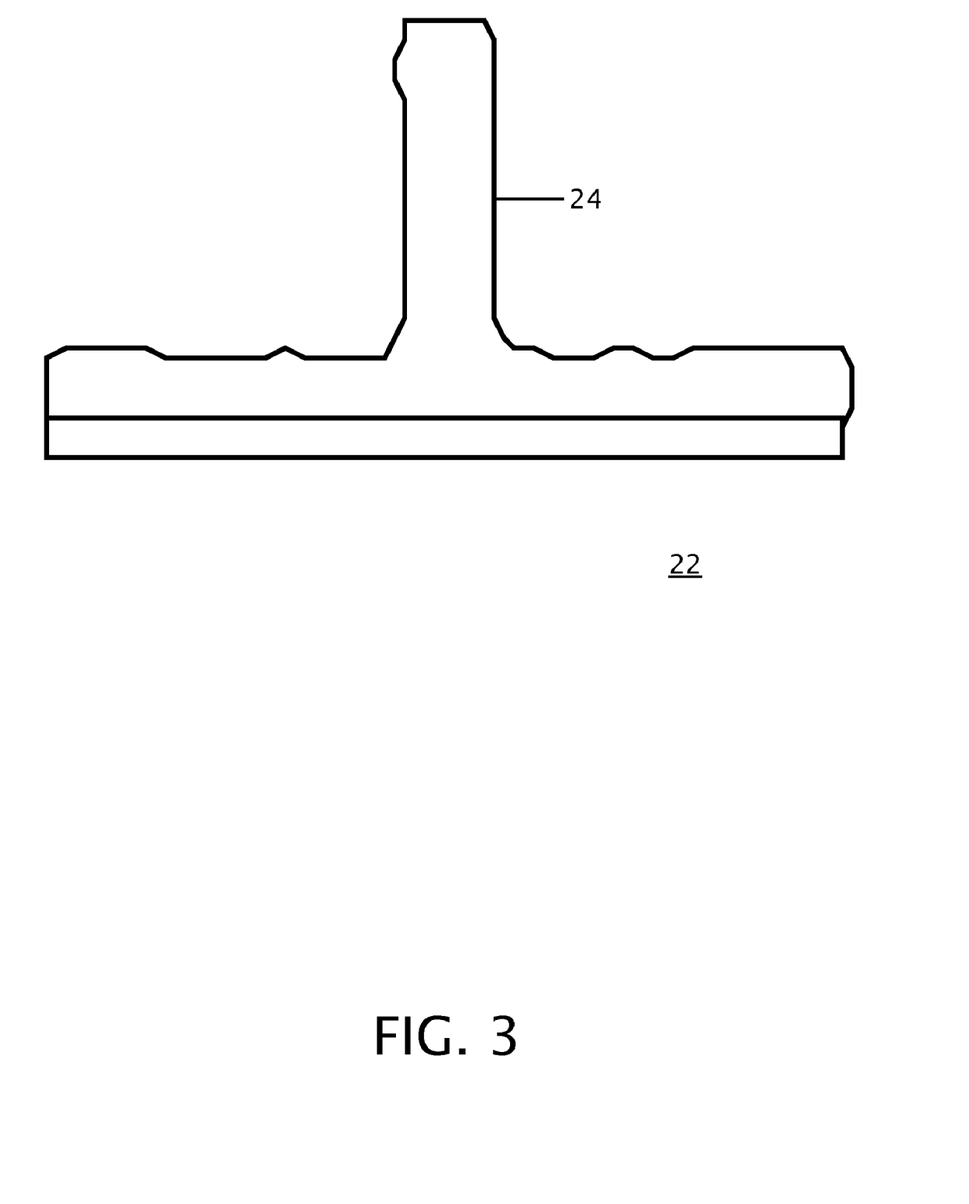
FIG. 3 shows the carbon nanotube of FIG. 1 coated with Si02 by a thermal CVD processing.

The process 10 of FIG. 1 continues at a deposition step 14 where a protective layer 24 is formed over the CNT 20. As shown in the embodiment of FIG. 3, the protective layer 24 may be deposited over the CNT 20 and substrate 22 to any desired thickness. As will be appreciated, any suitable deposition process such as thermal chemical vapor deposition (CVD) of Tetraethyl orthosilicate (TEOS) to form SiO2 over the CNT 20 and substrate 22, may be used. One specific embodiment contemplates using a Tetraethyl Orthosilicate precursor at about 500 mtorr and about 725 C.

As will be appreciated, other material deposition techniques and other coating materials are possible. Deposition techniques such as physical vapor deposition (PVD), chemical vapor deposition (CVD), Plasma Enhanced chemical vapor deposition (PECVD) electrochemical deposition (ECD), molecular beam epitaxy (MBE) Electrochemical Deposition (ECD) Spin Casting, Evaporation, Reactive Growth, and atomic layer deposition (ALD) are possible.

Figure 4:
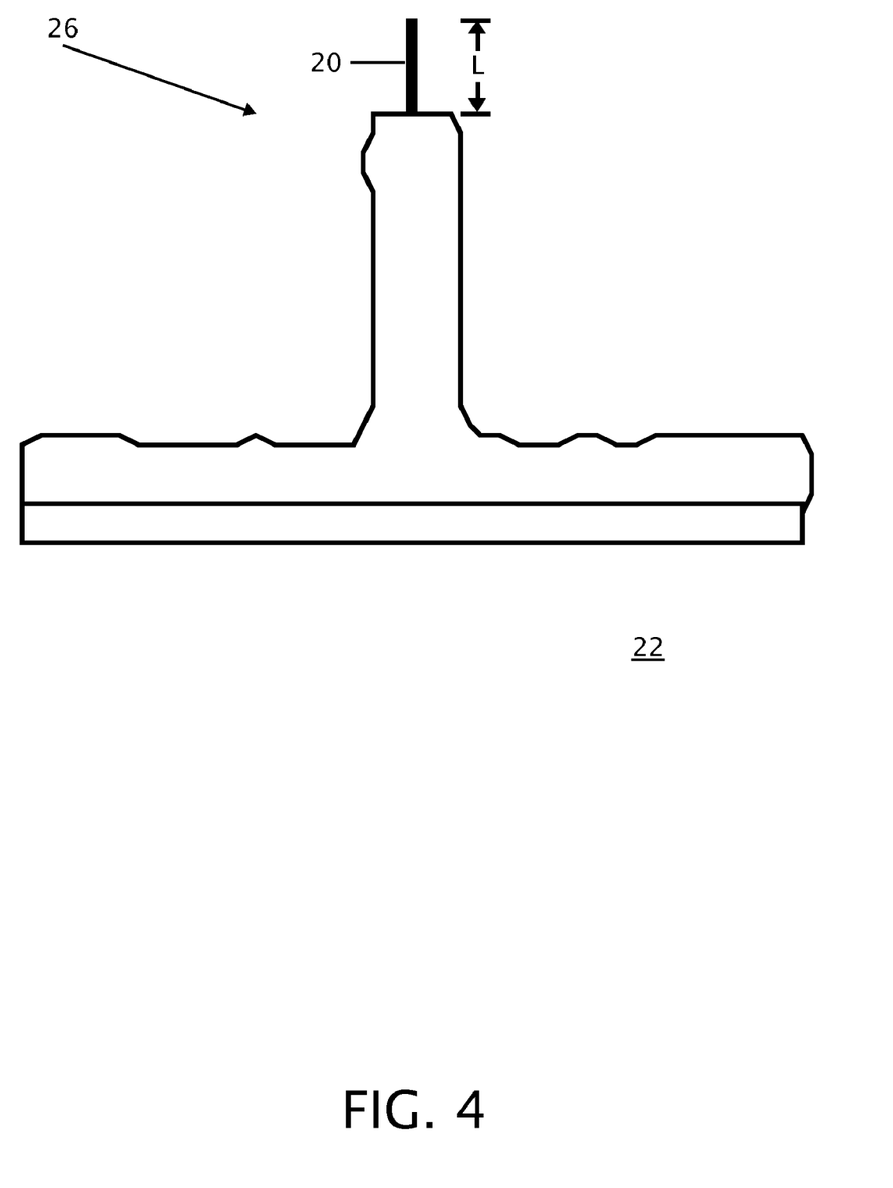
FIG. 4 illustrates a CNT device formed using an ion beam etch or other etch technique.

Other possible materials are silicon, silicon nitride, doped or compound silicon, polymers, and lithographic resist materials, The CNT device fabrication process 10 continues at an etch step 16 by etching back the support layer 24 as shown in FIG. 4 to expose a controlled length L of the CNT 20. As will be appreciated, the removal of the support layer 24 and exposure of the controlled length L of the CNT 20 may be accomplished through any suitable mechanism. For example, an ion beam etch may be used for etching the end of the coated CNT 20 preferentially, and reactive ion etching and wet etching using HF may be used to further expose the CNT 20 and/or to clean SiO2 remnant or residue from the CNT. Once the appropriate controlled length L of the CNT 20 has been exposed, and the device cleaned, a CNT device 26 is at least partially fabricated by the process 10.

According to certain embodiments, the CNT device 26 is formed as an Atomic Force Microscopy (AFM) probe. Various lengths L of exposed CNT 20 will define the CNT device 26 utility as an AFM probe. A CNT device 26 with longer exposed length is used for high aspect ratio imaging and a CNT device 26 with a shorter exposed length is best used for high resolution imaging. Short lengths of exposed CNT 20 or even recessed but still exposed CNT probes can be used for electrochemical purposes. The SiO2 coating also serves to reinforce and stabilize the CNT 20.

Techniques that allow placement or growth of nanotubes in desired locations are known in the art and examples of such techniques are described in the following three articles which are incorporated by reference herein. See (1) "Carbon nanotubes as probes for atomic force microscopy", Nanotechnology 11(2000) 1-5; (2) "Improved Fabrication approach for carbon nanotube probe devices", Appl. Phys. Lett., vol. 77, number 21, November 2000; and (3) "Growth of carbon nanotubes by thermal and plasma chemical vapor deposition processes and applications in microscopy", Nanotechnology 13 (2002) 280-284.

As discussed above, a carbon nanotube can be used as the probe in an AFM and SPM. There are many known examples of the use of carbon nanotubes for these instruments as well as examples of techniques to attach, grow or otherwise locate a nanotube on the probing apparatus of the instrument.

Figure 5:
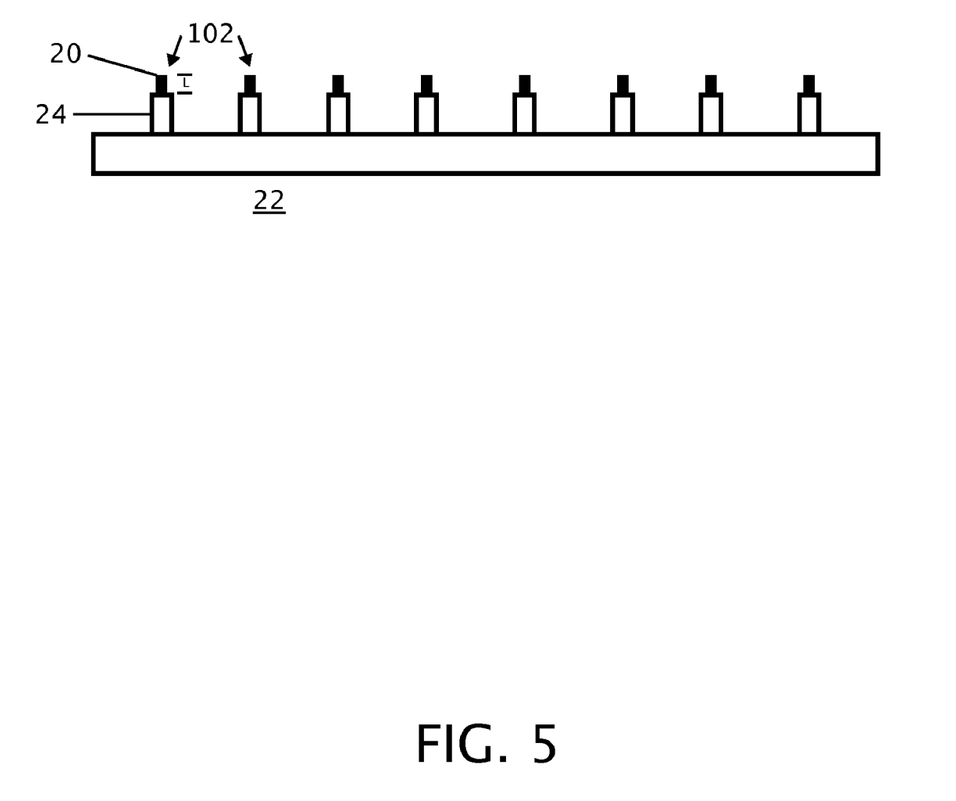
FIG. 5 illustrates a plurality of CNT devices formed on a substrate according to one aspect of the present invention.
Figure 6A:
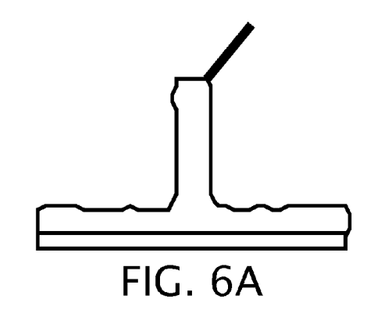
FIG. 6A-6E show configuration variations for a CNT device.
Figure 6B:
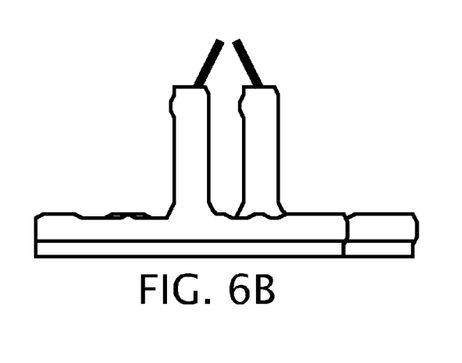
Figure 6C:
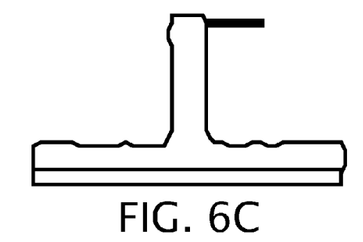
Figure 6D:
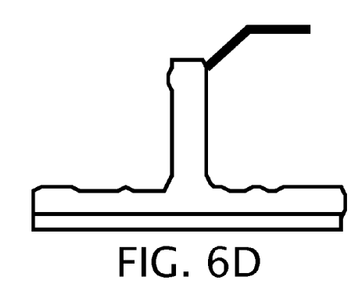
Figure 6E:
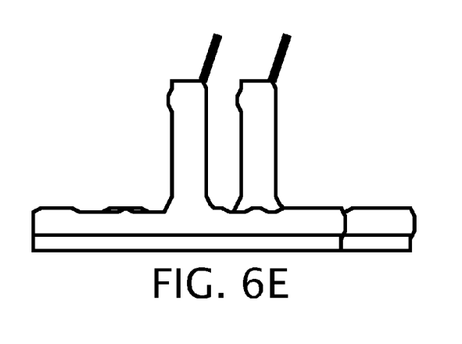

FIG. 5 illustrates a CNT apparatus 100 formed with a plurality of CNT devices 102 formed on a substrate 22. Each CNT device 102 includes a CNT 20, covered by a protective layer 24 that has been etched back and cleaned to expose a length L of the CNT 20. Those skilled in the art will readily extrapolate from the description of FIG. 1-4 how to fabricate the CNT apparatus 100. In brief, the plurality of devices 102 may be formed as an array on the substrate 22, or in any other arrangement as desired by the application. The CNT apparatus 100 may be broken up into smaller segments of CNT devices 102, or may be used complete as a single CNT device.

FIGS. 6A-6E illustrate several variations possible for a CNT device of the present invention. As can be seen, the exposed length of the CNT can take on a variety of shapes which may be defined during the CNT growth and/or attachment step, as well as through any suitable mechanism.

Figure 7A:
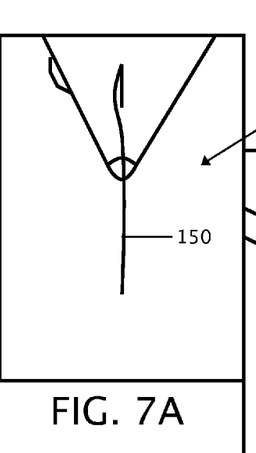
FIG. 7A-7D show experimental results of applying one technique of this invention to a CNT AFM probe.

FIGS. 7A-7D are renderings of photographs of an experiment performed by the applicant as an example of forming a CNT device. FIG. 7A illustrates a CNT 150 formed grown on a 1 cm length of Pt/Ir wire that was 1 mm in diameter. The wire was first immersed in an Fe containing solution and then underwent thermal CVD treatment by heating it to 750 C in the presence of Ethylene. Carbon nanotubes such as CNT 150 grew spontaneously under these conditions in the presence of the Fe catalyst.

As will be appreciated, nanotubes can be grown on almost any substrate 152 that can withstand the growth temperature and catalysts can be any transition metal or other catalyst. Catalyst can be liquid phase, sputtered or evaporated onto a surface, in colloids or nanoparticle form or otherwise located onto substrate. Under observation through an optical microscope, the wire that contained the nanotubes and a scanning probe assembly are brought into close proximity. The wire and the tip are each connected to a terminal of a 110 V power supply. A nanotube is selected and brought into contact with the tip. A potential is applied and, at a sufficiently high current, the nanotube will fuse to the tip surface due to resistive heating at the nanotube-probe assembly junction.

Although nanotubes have a high current carrying capacity, they also typically have defects and resistive heating also builds up at defect sites. The nanotube splits at such a site at sufficiently high currents. This process leaves a portion of the nanotube still on the wire and another portion attached to the probe assembly for use as a scanning probe. Note the existence of a variety of known techniques for placing the nanotube, e.g., nanotubes can be directly grown onto desired locations, or attached by glues, adhesives, electron beam deposition, ion beam deposition, etc.

Figure 7B:
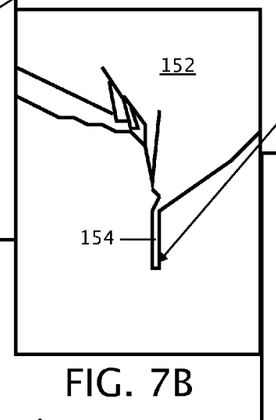
Figure 7C:
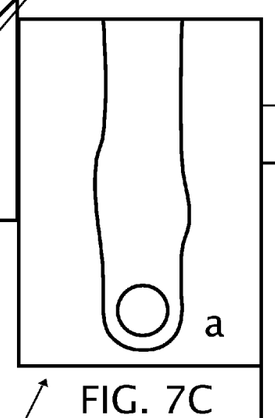
Figure 7D:
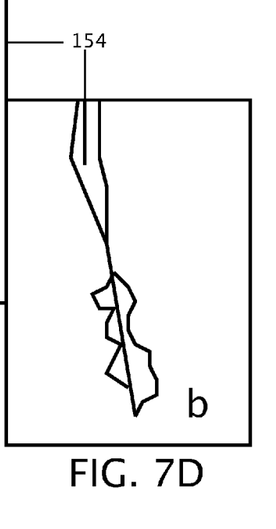

FIG. 7B illustrates a protecting layer 154 formed over the CNT 150 through a thermal CVD deposition of Tetraethyl orthosilicate TEOS to form an SiO2 layer over the CNT 150. FIGS. 7C and 7D illustrate a CNT device 154 having a controlled length L of exposed CNT 150. The CNT device 154 of FIG. 7C has short length of exposed CNT 150 and is suitable for an electrochemistry probe. The CNT of device 154 of FIG. 7D has longer length of exposed CNT 150 and is suitable for scanning probe applications. The foregoing description of the invention has been presented for purposes of illustration and description and is not intended to be exhaustive or to limit the invention to the precise form disclosed. Many modifications and variations are possible in light of the above teaching. For example, the application describes the nanotubes but would also be applicable to any other nanostructure including: whiskers, rods, sheets, cones, etc. The embodiments disclosed were meant only to explain the principles of the invention and its practical application to thereby enable others skilled in the art to best use the invention in various embodiments and with various modifications suited to the particular use contemplated.

The invention claimed is:

1. A process for fabricating a carbon nanotube (CNT) device, the process comprising:
    forming a CNT on a substrate using a first thermal CVD process, said CNT having a first end and a second end, said second end of said CNT coupled to said substrate;
    forming a protective layer covering said CNT, wherein said protective layer is defined based on an intended application of said CNT device; and
    removing a controlled portion of said protective layer to expose a desired length of said first end of said CNT, wherein said desired length is defined based on the intended application of said CNT device.

2. A process for fabricating a CNT device as recited in claim 1, wherein forming said CNT on said substrate includes forming said CNT separate from said substrate and then attaching said second end of said CNT to said substrate.

3. A process for fabricating a CNT device as recited in claim 1, wherein forming said CNT on said substrate includes growing said CNT from said substrate such that said second end of said CNT is coupled to said substrate.

4. A process for fabricating a CNT device as recited in claim 1 wherein said substrate is a conducting substrate.

5. A process for fabricating a CNT device as recited in claim 1, wherein forming said protective layer includes forming an SiO2 layer over said substrate.

6. A process for fabricating a CNT device as recited in claim 5, wherein forming said SiO2 layer includes thermal chemical vapor deposition (CVD) of Tetraethyl orthosilicate (TEOS) over said CNT and said substrate.

7. A process for fabricating a CNT device as recited in claim 6, wherein forming said SiO2 layer includes using a Tetraethyl Orthosilicate precursor at about 500 mtorr and about 725C.

8. A process for fabricating a CNT device as recited in claim 1, wherein removing a portion of said protective layer to expose a desired length of said first end of said CNT includes etching said protective layer.

9. A process for fabricating a CNT device as recited in claim 8, wherein said etching includes at least one of an ion beam etch, a reactive ion etch, and a wet etch.

10. A process for fabricating a CNT device as recited in claim 9, wherein said etching includes said ion beam etch to remove a bulk of material, and at least one of said reactive ion etch and said wet etch to perform clean up.

11. A process for fabricating a CNT device as recited in claim 1, wherein the CNT device is formed as an Atomic Force Microscopy (AFM) probe.

12. A process for fabricating a CNT device as recited in claim 11, wherein said exposed length of said CNT is suitable for high aspect ratio imaging.

13. A process for fabricating a CNT device as recited in claim 11, wherein said exposed length of said CNT is suitable for electrochemical purposes.

14. A carbon nanotube (CNT) device comprising:
a substrate;
a CNT element having a first end and a second end, said second end of said CNT element attached to said substrate, wherein said CNT element is formed using a first thermal CVD process;
a protective layer covering at least a portion of said substrate and at least a portion of said CNT element, wherein said protective layer is formed using a second thermal CVD process; and
wherein a length of said first end of said CNT is exposed, said exposed length being defined by a specific application for said CNT device.

15. A CNT device as recited in claim 14, wherein said CNT device is an Atomic Force Microscopy (AFM) probe.

16. A CNT device as recited in claim 15, wherein said exposed length is suitable for high aspect ratio imaging.

17. A CNT device as recited in claim 15, wherein said exposed length is suitable for high resolution imaging.

18. A CNT device as recited in claim 14, wherein said protective layer is comprised substantially of SiO2.

19. A CNT device as recited in claim 14, wherein said substrate is a conductive substrate.

20. A carbon nanotube device comprising:
a substrate;
a plurality of CNT elements, each CNT element having a first end and a second end, said second end of each CNT element attached to said substrate, wherein each of the plurality of CNT elements is fabricated using a first thermal CVD process;
a protective layer covering at least a portion of said substrate and at least a portion of each of said plurality of CNT elements, wherein said protective layer is defined based on an intended application of said CNT device; and
wherein for each CNT element, a length of each first end of each CNT is exposed, said exposed length being defined by the intended application for said CNT device.

21. A process for fabricating a carbon nanotube (CNT) device for use as an atomic-force-microscope (AFM) scanning probe, the process comprising:
forming a CNT on a substrate using a first thermal CVD process, said CNT having a first end and a second end, said second end of said CNT coupled to said substrate;
placing said first end of said CNT in contact with a first end of said AFM scanning probe;
supplying an electric power to said substrate and to a second end of said AFM scanning probe to cause said first end of said CNT to fuse with said first end of said AFM scanning probe;
continuing to supply said electric power to said substrate and to said second end of said AFM scanning probe until said CNT splits at a defect site, wherein a first portion of said CNT remains coupled to said substrate and a second portion of said CNT remains fused to said first end of said AFM scanning probe subsequent to said splitting of said CNT;
forming a protective layer covering said CNT using a second thermal CVD process; and
removing a controlled portion of said protective layer to expose a desired length of said first end of said CNT, wherein said desired length is defined based on a specific application for said AFM scanning probe.

* * * * *